United States Patent
Rao

(10) Patent No.: US 12,298,139 B1
(45) Date of Patent: May 13, 2025

(54) AUTONOMOUS AV NAVIGATIONAL APPROACHES BASED ON COMPUTATIONAL RESOURCES

(71) Applicant: Sanjay K. Rao, Palo Alto, CA (US)

(72) Inventor: Sanjay K. Rao, Palo Alto, CA (US)

(73) Assignee: Accelerate Labs, LLC

( * ) Notice: Subject to any disclaimer, the term of this patent is extended or adjusted under 35 U.S.C. 154(b) by 0 days.

(21) Appl. No.: 17/175,708

(22) Filed: Feb. 15, 2021

Related U.S. Application Data

(63) Continuation of application No. 16/658,108, filed on Oct. 20, 2019, now Pat. No. 10,962,372.

(Continued)

(51) Int. Cl.
*G01C 21/20* (2006.01)
*B60W 60/00* (2020.01)
(Continued)

(52) U.S. Cl.
CPC ......... *G01C 21/20* (2013.01); *B60W 60/0011* (2020.02); *G01C 21/3484* (2013.01);
(Continued)

(58) Field of Classification Search
CPC ........ G01C 21/20; G01C 21/26; G01C 21/34; G01C 21/3407; G01C 21/3415; G01C 21/3461; G01C 21/3484; G01C 21/3492; G01C 21/00; G01C 21/005; G01C 21/28; G01C 21/343; G01C 21/3446; G01C 21/3453; G01C 21/36; G01C 21/3602; G01C 21/3605; G01C 21/3617; G01C 21/3626; G01C 21/3641; G01C 21/3691; G01C 21/3694; G01C 21/38; G05D 1/0212; G05D 1/0276; G05D 1/0287; G05D 1/0291; G05D 1/20; G05D 1/22; G05D 1/221; G05D 1/225; G05D 1/229; G05D 1/24; G05D 1/243; G05D 1/244;
(Continued)

(56) References Cited

U.S. PATENT DOCUMENTS

| | | | |
|---|---|---|---|
| 2009/0005964 A1* | 1/2009 | Forstall .............. | G01C 21/3484 701/533 |
| 2017/0174215 A1* | 6/2017 | Tseng .................. | B60W 10/184 |

(Continued)

*Primary Examiner* — Russell Frejd
*Assistant Examiner* — Sara J Lewandroski

(57) ABSTRACT

An artificial intelligence-based routing and path optimization module is enabled for autonomous AVs. The AV is enabled to navigate to surface roads based on the computational complexity of the navigation and the computational power within the autonomous self-driving AV, a cloud infrastructure, and/or an edge device. An AI based model is implemented to determine which navigational approaches are appropriate for an autonomous AV to pursue based on compute resources available and compute resources required. A module implemented in a cloud based server and/or within an autonomous AV is enabled to match the computational complexity of routes with the navigation. The autonomous AV is enabled to create a navigational prediction movement model for these objects to determine the likely behavior of the objects. The AV may include autonomous cars, autonomous trucks, vertical take off and landing (VTOL) devices, electric VTOL, electric bikes, flying cars, and other transportation devices.

10 Claims, 10 Drawing Sheets

Related U.S. Application Data

(60) Provisional application No. 62/787,255, filed on Dec. 31, 2018.

(51) Int. Cl.
*G01C 21/34* (2006.01)
*G05D 1/00* (2006.01)
*G05D 1/02* (2020.01)

(52) U.S. Cl.
CPC ......... *G05D 1/0212* (2013.01); *G05D 1/0276* (2013.01); *B60W 60/0013* (2020.02); *B60W 60/00253* (2020.02)

(58) Field of Classification Search
CPC ...... G05D 1/2435; G05D 1/2446; G05D 1/40; G05D 1/43; G05D 1/60; G05D 1/617; G05D 1/622; G05D 3/00; G05D 2101/20; G05D 2101/22; G05D 2107/00; G05D 2107/13; G05D 2109/10; B60W 50/0097; B60W 50/0098; B60W 60/00; B60W 60/001; B60W 60/0011; B60W 60/0013; B60W 60/0015; B60W 60/0016; B60W 60/0017; B60W 60/00184; B60W 60/00186; B60W 60/0021; B60W 60/0025; B60W 60/00253; B60W 60/00257; B60W 60/0027; B60W 60/00272; B60W 60/00274; B60W 60/00276

See application file for complete search history.

(56) References Cited

U.S. PATENT DOCUMENTS

| | | | |
|---|---|---|---|
| 2017/0292843 A1* | 10/2017 | Wei | G01C 21/3453 |
| 2019/0228375 A1* | 7/2019 | Laury | G05D 1/0088 |
| 2020/0134525 A1* | 4/2020 | Goldman | G01C 21/3453 |
| 2020/0191589 A1* | 6/2020 | Tamai | G01C 21/3484 |

\* cited by examiner

Autonomous Vehicle Fleet

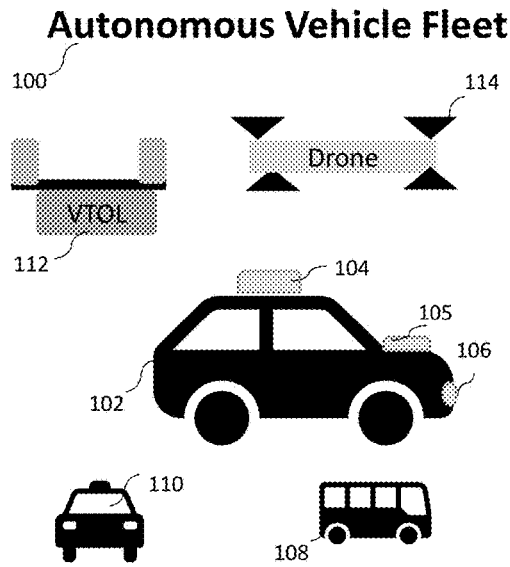

Vehicle 1: Settings
- Automation:
- AV Level:
- Processing:
- Electric Vehicle Charge State:
- Motion Sickness Reduction:

Vehicle 2:
...

Routing and Mapping Modules

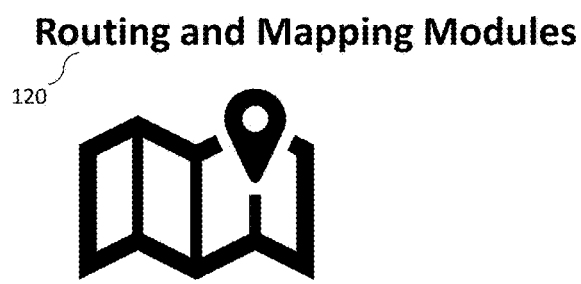

- Route 1: Freeway -Street
- Route 2: Express Way- Streets
- Route 3: Residential Street

Drivers / Passengers 1, 2

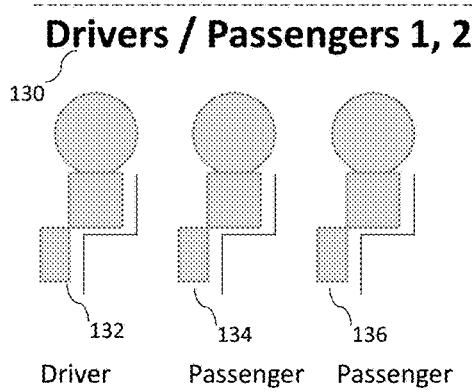

Driver    Passenger    Passenger

- Pref 1: Minimize Motion Sickness
- Pref 2: Speed to destination
- Pref 3: Low Variance
- Pref 4: Ability for Human to intervene

FIG. 1

Vehicle and Route Selection

| Route | Vehicle | Human & AV Capability | Complexity | Safety Score | AV friendly Score | Motion Sickness Adjustments |
|---|---|---|---|---|---|---|
| A – Surface Street | Vehice-1 | L1-L5 Human not needed | Low | High | High | Low |
| B – Freeway & Streets | Cars manufactured last 5 years | Human not needed | High | Med | | Low |
| C – Winding Streets | No trucks | Human Assistant Required | High | Low | Low | High |

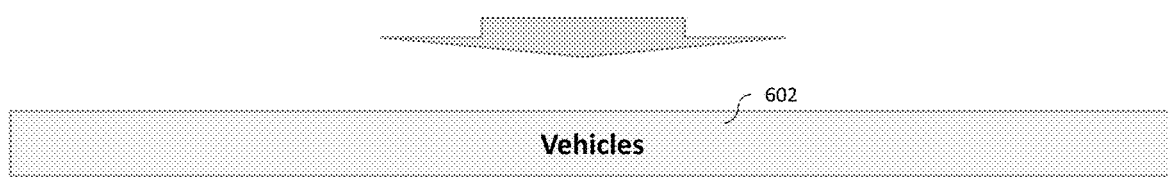

Vehicles

   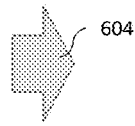

Route A, C    Route A    Route A,B,C

FIG. 6

AUTONOMOUS AV NAVIGATIONAL APPROACHES BASED ON COMPUTATIONAL RESOURCES

CROSS-REFERENCE TO RELATED APPLICATIONS

This application is a continuation of U.S. patent application Ser. No. 16/658,108 filed on Oct. 20, 2019, which claims the benefit of U.S. Provisional Application No. 62/787,255, filed Dec. 31, 2018. The entire disclosures of U.S. patent application Ser. No. 16/658,108 and U.S. Provisional Application No. 62/787,255 are herein incorporated by reference in their entirety.

BACKGROUND

This disclosure relates to autonomous devices and computational resources.

SUMMARY

It is an aspect of the present disclosure to enable autonomous vehicles (AV) to make an optimized and appropriate selection of a sequence of routing decisions for transportation that is personalized and customized to the characteristic of the AV, the routing paths available and the passengers of the autonomous AV. Many human driven AVs may be able to cope with varying situations and environments but creating these same environments for autonomous AVs may be more appropriate to only certain types of AVs and under certain situations, times, and select routes.

Based on an artificial intelligence (AI) and/or software implemented routing and optimization system executed by one or more processors of one or more servers, mobile devices, and/or autonomous AVs, an appropriate set of routing decisions may be made for one or more autonomous AV to select a path from a first location to a second, third, and/or a series of locations.

In some instances, the server may include a software module executed by a server or a device.

In some embodiments, a module may provide a selection between a first point and a second or n-th point.

A server may include an artificial intelligence module that performs machine learning and leverages neural networks to appropriately match AVs, routes, and passenger preferences. As an example, the server may be enabled to use machine learning to understand which routes are most effective for autonomous AVs using data such as the time to move between one place and another relative to an estimate, the number of accidents along a certain path, and a complexity of the route as evidenced by an object recognition system which identifies potentially dangerous AVs and movements.

A. Autonomous AV: In some instances, the characteristics of the AV may include factors such as whether it is fully autonomous, the charge state of the AV, the size of the autonomous AV, power rating of the autonomous AV, processing power of the autonomous AV, size of AV, capacity for passengers, and other factors. This aspect may further include whether the autonomous AV is enabled to be controlled by a remote driver. The autonomous AV may further be enabled with one or more LiDAR systems. A plurality of LiDAR devices may be positioned on the autonomous AV in various positions including the roof, side, rear, trunk and so forth.

One or more modules may be enabled across a plurality of variables to enable a selection of a specific route.

An autonomous AV itself to determine which set of paths is most appropriate given a set of constraints.

In some embodiments, the autonomous AV and/or a server may select a prediction of the paths of other AVs and objects in the environment.

In a preferred embodiment, the autonomous AV is enabled to set a maximum goal and a plurality of minimum goals associated with its trajectory and paths.

In some embodiments, the selection of these paths can be context dependent, AV dependent, passenger dependent, location dependent, time dependent, traffic dependent, distance dependent, fuel economy of AV dependent, proximity to electric charging station dependent, passenger carpool dependent, and so forth. This disclosure relates to the identification of multiple paths, the selection of a specific path, and the modification of a selected path responsive to the environment.

A module is enabled to determine a set of paths for the AV to follow including overall paths.

C. User Passenger Preferences: In addition, in an autonomous AV and ridesharing system, the appropriate AV may be delivered to a user for a pickup and drop-off based on the characteristics of the route selected between the pick up and drop off, the needs and characteristics of the passengers, and capabilities of the autonomous and/or ridesharing AV. As an example, the ability for a human driver either locally in the AV or remotely in a cloud remote driving center, to take over the AV upon an emergency may enable the AV to engage a fully autonomous mode.

It should be noted that the server may comprises of a plurality of servers. The software modules may be executed by one or more processors including processors across a plurality of machines. A plurality of distributed systems, decentralized devices, and centralized devices may be used for compute, storage, and processing. A plurality of application programming interfaces may be used by to allow for interactive services from vendors such as streaming music providers to AV preferences to seat preferences to climate control and temperature preferences.

A pick up and drop off may be defined by the user via a mobile application, voice command, or other user interface. An indication may be calculated using the time required for the route, the distance to be travelled, and a quality of service indication.

An Artificial Intelligence based model may be created such that images, 3D representations, may be captured, and analyzed by the autonomous AV or a cloud based server. These that is enabled to recognized various objects on a road and report to a server to create localized maps of areas that are 3D in nature. Further these maps may be linked to various descriptive statistics around how complex routes and intersections appear to be. Further, the analysis of these objects provides for autonomous AV friendly routes to be created based on whether objects that are likely not to be friendly to autonomous AVs are present.

A training and learning model may be enabled such that AVs may capture objects, and these objects may further be classified as being AV friendly or AV unfriendly. Accordingly, during route planning an optimization function may be created that preferences AV friendly routes versus AV unfriendly routes. As an example, an AV friendly object that may be captured are clearly defined lane markings whereas an AV unfriendly route may not have any lane markings. An additional example of an AV friendly route may include the presence of a only right turns, projected left turns, clearly defined bike lanes, or the historical presence of few AVs.

The artificial intelligence platform may be accessed via one or more servers of the autonomous AV itself.

In some embodiments, a plurality of light detection and ranging systems may be used including lasers, LIDAR, multi-channel LIDAR, and a plurality of camera devices.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

FIG. 1 depicts a plurality of components of autonomous AVs, routing, and passenger characteristics.

FIG. 6 depicts a plurality of sorting capabilities and a corresponding match to one or more AVs as part of a ridesharing or AV network.

DETAILED DESCRIPTION

Figure 2:
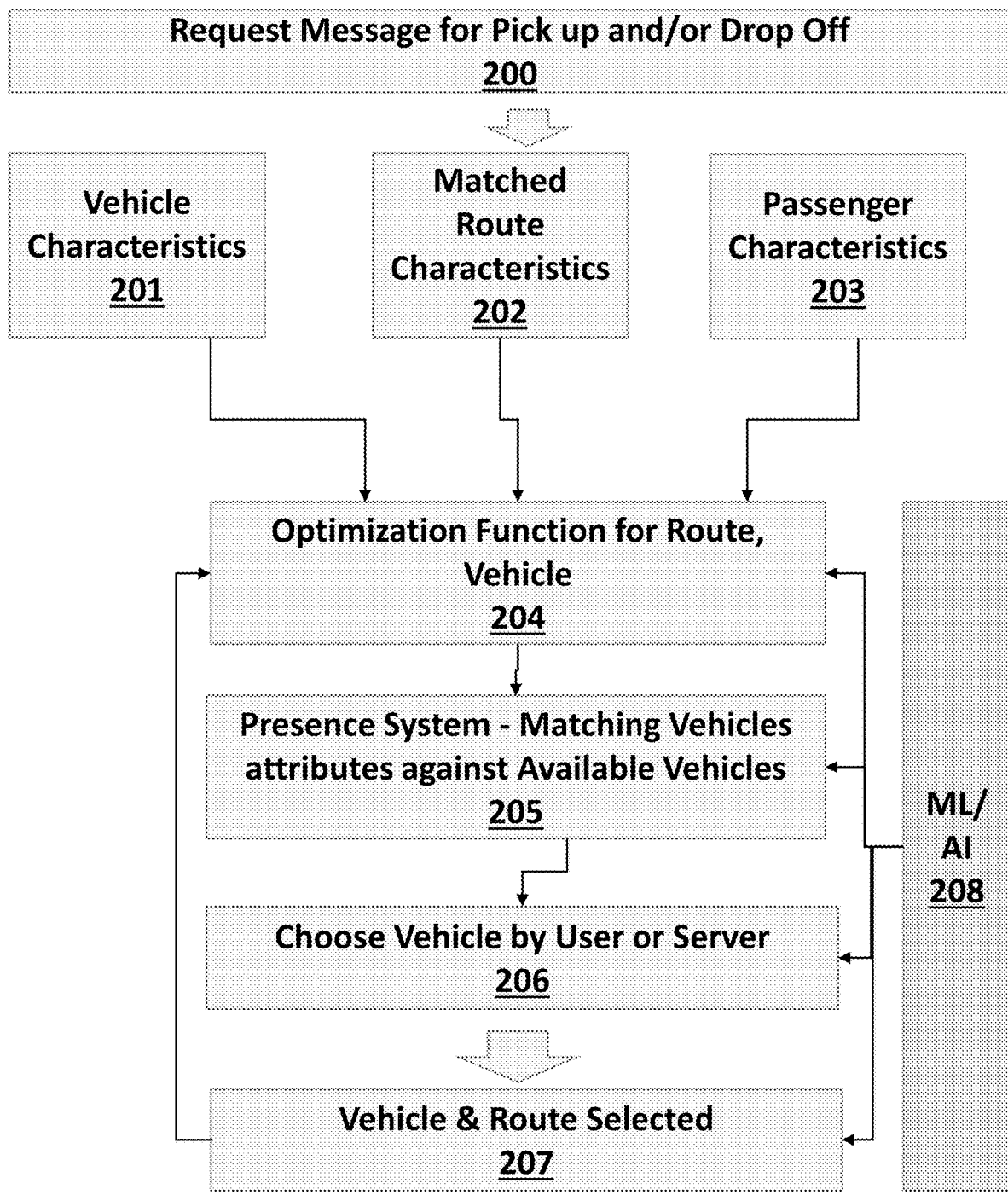
FIG. 2 depicts a request to selecting a route for an autonomous AV.

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to those embodiments. On the contrary, the disclosure is intended to cover alternatives, modifications and equivalents, which may be included within the spirit and scope of the disclosure as defined by the appended claims.

Referring to FIG. 1, FIG. 1 depicts three aspects of an autonomous AV system 100. The autonomous AV 102 may be equipped with various devices that are affixed to the AV. These devices may include barometric pressure gauges, accelerometers, gyroscopes, magnetometers, and inertial measurement units (IMU). These devices may be enabled to capture readings including force, angle, momentum, velocity may further be obtained by one or more sensors. The AV may further be configured with one or more LIDAR 104 systems and cameras 106. These devices may be positioned in various places across the AV to ensure an appropriate field of view.

In some embodiments, autonomous AVs may include greater processing power via a plurality of processors including CPUs, GPUs, and custom ASICS. The autonomous AVs may further include a plurality of LiDAR systems 104, cameras 106, and other sensory acquisition devices 105 to understand environments. These sensors are enabled to capture and map environments proximate to the autonomous AV. The environments may be rendered with a 3D high definition view of the environment including wireframes of one or more objects.

In one instance, a score is calculated based on a historical data observed, historical data captured, accident data, data captured from a network of video cameras, autonomous AVs, and other sources.

Referring still to FIG. 1, it is an aspect of the present disclosure to enable the platform for use in ride sharing systems including those that match individuals or groups with drivers of AVs or AVs or autonomous or semi-autonomous AVs. The profile of the autonomous AV may change based on whether passengers are in the AV and based on the types of passengers such as an infant or elderly person or whether a human driver is present and enabled to take over driving of the autonomous AV. As an example, a younger or older passenger in the AV may result in a slower path that involves fewer bumps and less aggressive driving. A selection of paths may further be influenced by a user's feelings of nausea or motion sickness.

Various types of autonomous AVs may be part of a ridesharing service, car sharing service, a fleet, a distributed network of a variety of AVs, an owned and operated by dealer network, an overlay AV network comprised of individuals and businesses that may be accessed and commanded by one or more mobile devices including cellular telephones, smart phones, tablet computers, and other network connected devices. The AVs may further be part of a hybrid autonomous and non autonomous ridesharing system in which a cloud based server coordinates the pick up and drop off of passengers and/or goods in conjunction with a plurality of mobile applications stored in non-transitory computer readable mediums to be executed by processors of one or more mobile devices. The coordination and selection of the type of AV to be matched to a consumer can be based on a plurality of factors including the customer profile, the route between the origination and destination, and the capabilities of the autonomous AV.

The autonomous AVs may further be part of a micro mobility service and mobility device reservation service including for example a variety of devices such as autonomous AVs, trucks, electric scooters, vertical take off and landing (VTOL) devices 112, UAVs and drones 114, airplanes, and other mobility devices. These devices may be personal mobility devices fit for one person or multi-person mobility devices for a plurality of individuals.

In a ridesharing mode or autonomous mode, the autonomous AV may be enabled to have caps on the speed and aggressiveness settings that the AV is capable of performing. These settings may be set by a cloud based service, a network policy, a custodial user preference over another user, or other factor. As an example, the AV may be limited to traveling only at a certain speed as determined by a mapping data associated with a speed limit over a particular area or based on a camera of the AV reading signs that include for example a speed limit sign.

Still referring to FIG. 1, the passengers of the AV may be enabled to configure various aspects of the AV. The AV may present in a user interface, in the car or on a mobile device application, to the user a variety of driving modes such as aggressive, comfort, fast, and slow. Taking these into account, the AV can select the route, trajectory and paths from among those routes that are calculated that matches characteristics of the driving mode. The driving mode can each have a profile which includes the various characteristics. The speed and driving style may further be modulated based on these user preferences.

One or more software modules are enabled to determine routes and rank the routes between various points. In various embodiments, the software used to perform the aspects of this disclosure may be implemented in one module, multiple software modules, various application programming interfaces (APIs), or other formats. It should be appreciated that while a specific name is attributed to a module in this disclosure, the module may be a submodule, separate module, API, or placed in another configuration across a plurality of servers.

Still referring to FIG. 1, a routing and mapping system 120 may be provided by a server or the autonomous AV to prioritize various routes between a first pick up and drop off location. A plurality of examples are disclosed below:

Route 1: As an example, in one instance a route may include a freeway portion and a street portion which may take for example 8 minutes overall. This route may be ranked as a high risk due to the speed of the freeway and historical accident data of the freeway which is above that of the other routes. Based on past historical data of other cars traveling on the route, the prediction that the time it will take of 8 minutes, may be rated with a high statistical confidence thereby rendering a low variance score on the prediction for how long the route will take to complete. Route 1 may be rated as having lower motion sickness due to the smooth rating of the journey, fast speeds, lack of start and stop, lack of winding paths, and previous historical user ratings.

Route 2: The variance is considered to be medium in terms of the time to reach the destination due to unpredictable traffic patterns. The variance is rated at low due in part to historical data and further due to the types of intersections that the autonomous AV traverses. Specifically, the unmediated nature of the expressway is rated as being more consistent and with less traffic during the time period of the route. A motion sickness rating may be obtained from users who complete the trip to describe any aspects of the trip of which one question may include if they experienced motion sickness. For example, route 2 may have a high degree of motion sickness due to the fast increase in acceleration or decrease in acceleration.

Route 3: Route 3 includes only residential streets and avoids downtown city streets. It has a time rating of 15 minutes with low risk due to the low speeds, stop sign and traffic light mediated intersections, low history of accidents, and low congestion. The variance on this route is calculated as high given the number of street lights, intersections, and past data. As an example, Route 3 may also result in certain users experiencing motion sickness due to the repeated start and stop of the AV. Route 3 may further be determined to cause motion sickness in certain passengers due to the winding nature of one or more roads, which is linked to levels of motion sickness.

Still referring to FIG. 1, FIG. 1 shows various user driver and passenger preferences that are enabled to be accounted in the routing system.

Referring now to FIG. 2, FIG. 2 depicts various aspects of routing a request 200 for transport from a first location to a second location.

AV Characteristics: The server is enabled to consult a database of AV characteristics 201.

Route Characteristics: The route characteristics module 202 includes a listing of routes that are available between the request area. These routes may include an autonomous friendly or autonomous capable measure. This refers to the ability for an autonomous AV to complete the entire route. These ratings can be grouped for AVs that are semi-autonomous and fully autonomous. In the case of semi-autonomous, a AV may be delivered to the pick up location but a user must agree to participate in the driving aspect or be on standby for it. In a fully autonomous configuration, the user would not be required to act as a driver and instead may be allowed to sit in the back of the AV. The route characteristics module may further deliver a listing of routes that are autonomous capable, partially autonomous such as a section of the route that can be satisfied by an autonomous mode, and a non-autonomous route. In a partial autonomous mode, a user is enabled to engage in non-driving activity for part of the trip. The autonomous AV could require that the individual be in a driving position with access to driving controls such as a steering wheel, or could agree to a full stop of the autonomous AV and then take over the autonomous AV under a user driven scenario.

A passenger characteristics module 203 may further be enabled.

The AV characteristics 201 may further include the level of autonomy associated with the AV. As an example, the AVs may be enabled with varying levels of autonomy ranging from L1 to L5. If a user is taking a route 203 that may be satisfied entirely by an autonomous approach, then a AV that is capable of full autonomous operation may be deployed instead of a semi-autonomous AV.

As an example, the descriptive features of the autonomous AV may for example include the presence of a motion sickness reduction system.

In some embodiments, the autonomous AV will take into account various characteristics of the potential available paths and determine which paths match most appropriately with the setting of the AV.

An optimization function is enabled.

A user is enabled to choose the autonomous AV 206 from a mobile device.

Figure 3:
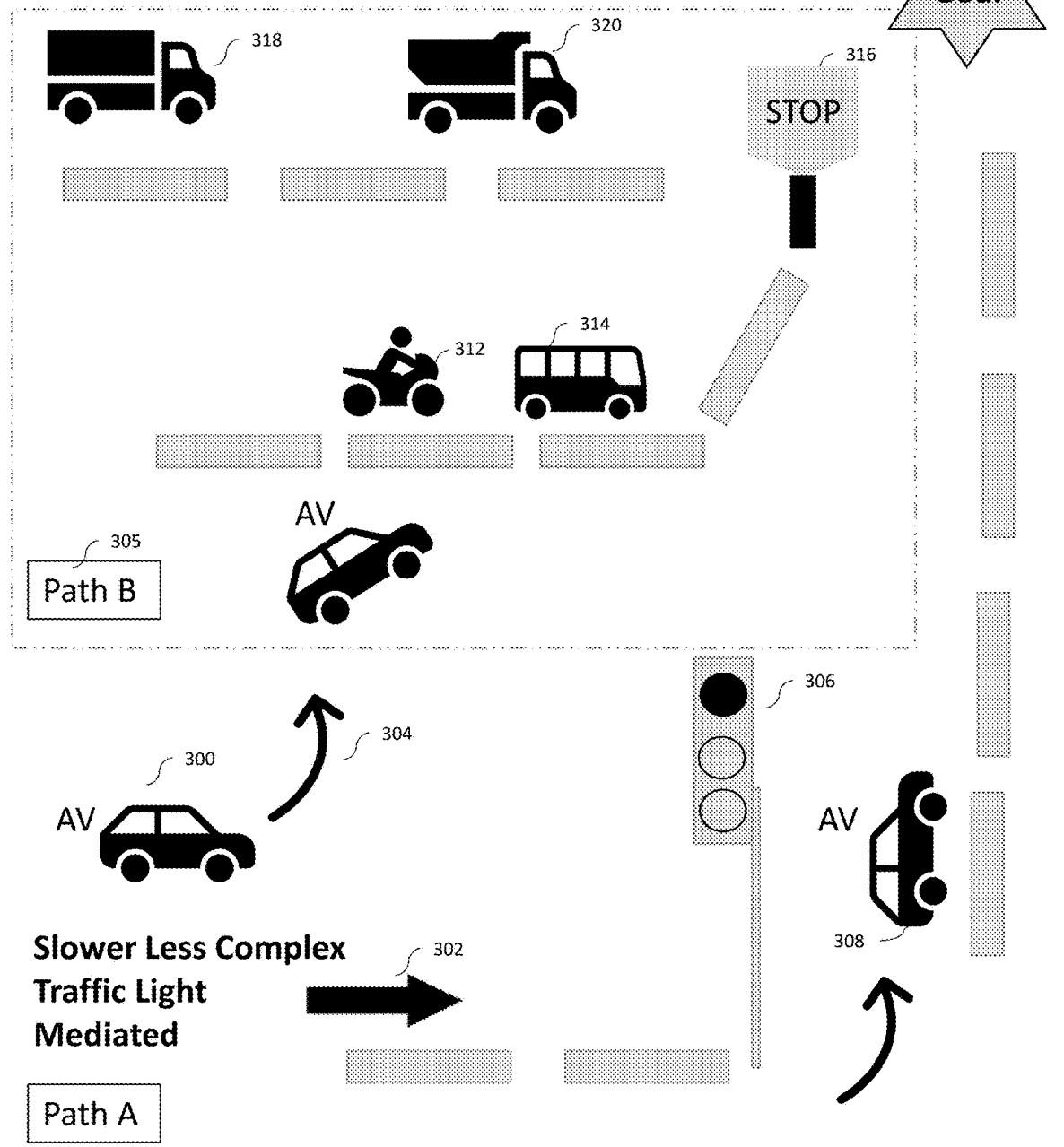
FIG. 3 depicts a decisioning platform to assess the complexity of intersections across a route.

Referring now to FIG. 3, FIG. 3 depicts an autonomous AV 300 navigating an intersection including a Path A 302 and a Path B 304 to reach a state 310.

Still referring to FIG. 3, the AV in the Path B 305 may encounter a host of AVs including a motorcycle 312, a bus 314, a truck 320, a cargo delivery AV 318, and so forth. The camera, LiDAR system, or one or more acquisition devices of the AV may capture the objects in the intersection. The server or the AV may rate the various objects encountered in the intersection to create a composite score for the intersection. The complexity rating of the intersection may be added to over time.

Still referring now to FIG. 3, the autonomous AV 300 may have two available paths to reach its goal destination of 310 that can further be evaluated by additional criteria. This goal may be defined by GPS position, a WiFi network position, a word combination position, or other identifier. A first path, Path A 304 may take longer and involve an unprotected left turn, which would have a negative score, but would largely be traffic free, which could have a higher positive score, and would have a traffic light which would be weighted with a higher score. However, the distance of Path A may be longer and take more time than that of Path B.

An autonomous AV with a limited set of cameras may be matched with Path A since it does not have the capabilities to appropriately image a highly complex environment.

The autonomous AV is further enabled to prioritize and execute on sub paths of an intersection based on predicted movements of identified objects. The autonomous AV is enabled to create a prediction movement model for these objects to determine the likely behavior of the objects.

The routing and mapping system may be implemented in cloud based server and/or within an autonomous AV and is enabled to prioritize a plurality of routes based on the overall score of various intersections in addition to the streets.

It is an aspect of the present disclosure to enable pre-calculation of environments.

As an example, a AV friendly score may be created for the round about intersection. The AV score may be configurable to include a plurality of factors. In this instance, a score of the intersection may be created which includes the following factors: number of AVs, number of turns, unprotected left turn, and traffic light mediated versus stop sign or no sign.

As an example a score of the AV may comprise of underlying data as listed below. Each aspect may be weighted and calculated according to a weighted average. A log function may normalize the results further. The overall scores may then be adjusted for the number of intersections, which in route 1 includes two intersections but in route includes only one intersection. That is the number of intersections may multiple the route 1 by a factor greater than 2, which would make Route 2 more attractive.

| Factor | Route 1: Intersection 1 | Route 1: Intersection 2 | Route 2: Intersection 1 |
|---|---|---|---|
| Number of AVs and/or Pedestrians Weighted Avg: .4 | 5 | 1 | 15 |
| Number of Turns Weighted Avg: .1 | 1 | 1 | 1 |
| Unprotected Left Weighted Avg: .4 | 0 | 1 | 1 |
| Speed Zone above 35 mph Weighted Avg: .1 | 1 | 0 | 0 |
| SCORE (weighted factor) | 2.2 | .9 | 6.5 |
| AV Friendly Score | Route 1 Score: 3.1 | | Route 2 Score: 6.5 |

In some instances, a setting regarding certain turn by turn signals can determine whether the AV can proceed on a selected route.

Figure 4:
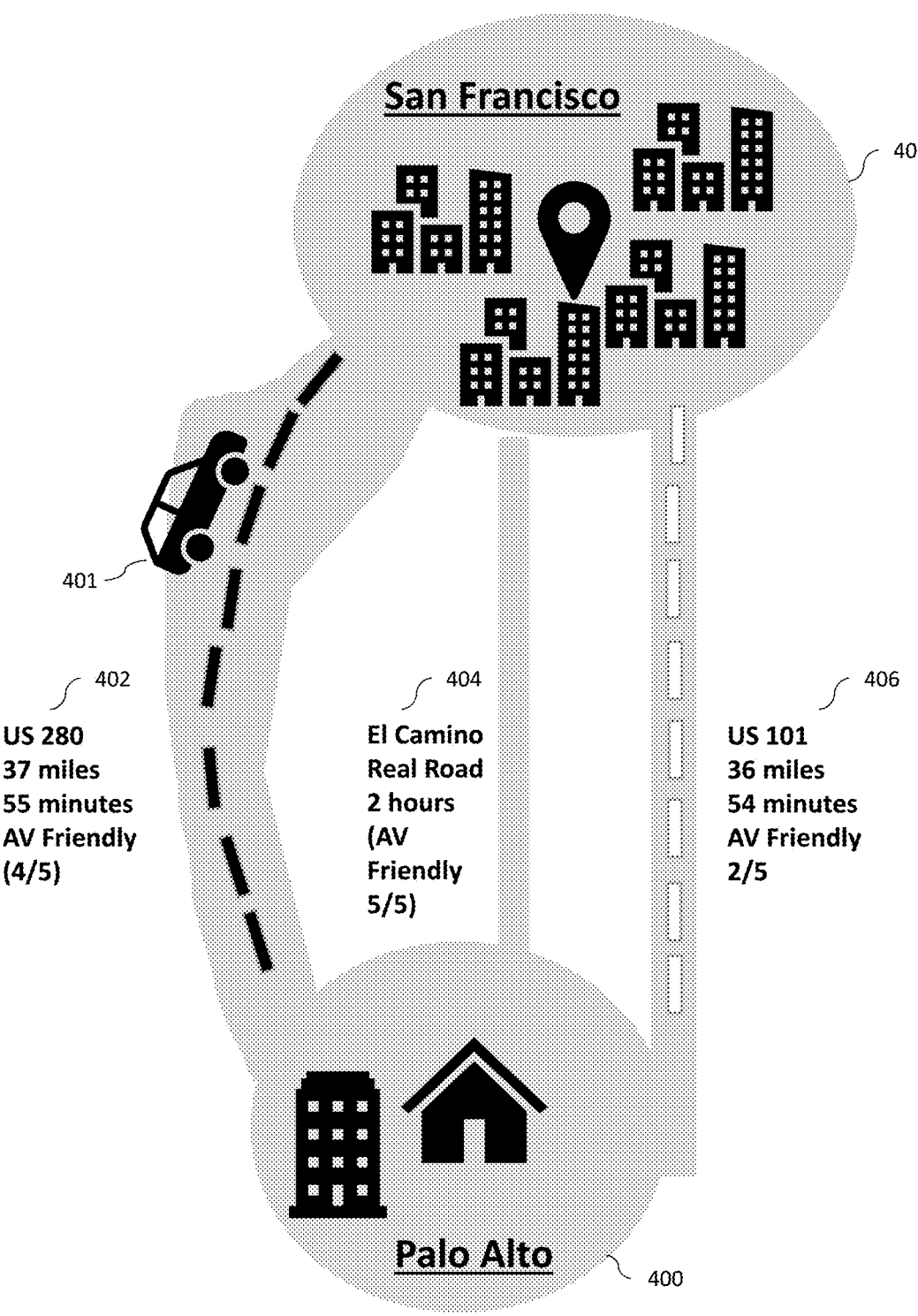
FIG. 4 depicts a mapping system between two locations that involves a plurality of paths with varying characteristics.

Referring now to FIG. 4, FIG. 4 depicts a set of routes that the autonomous AV may take from one point to another. A routing and navigation module may provide a plurality of paths including step by step directions from a first location to a second location. In various instances, the multiple paths may be associated with a plurality of different characteristics. In certain cases, the time it takes from one path to the other may be similar. Take for example a navigation path from Palo Alto, California to San Francisco, California. A routing module may present a path that includes a northbound trip on 101 while a second route includes a trip on a roughly parallel freeway 280. Both paths may take an equivalent time to reach San Francisco given the traffic conditions in spite of longer distances on one path versus the other. In these instances, other factors including user preferences, ride sharing preferences, and safety preferences may be used to select between the two routes. In addition, the autonomous AV or ride sharing preferences may also be used to determine which path to undertake.

Figure 5:
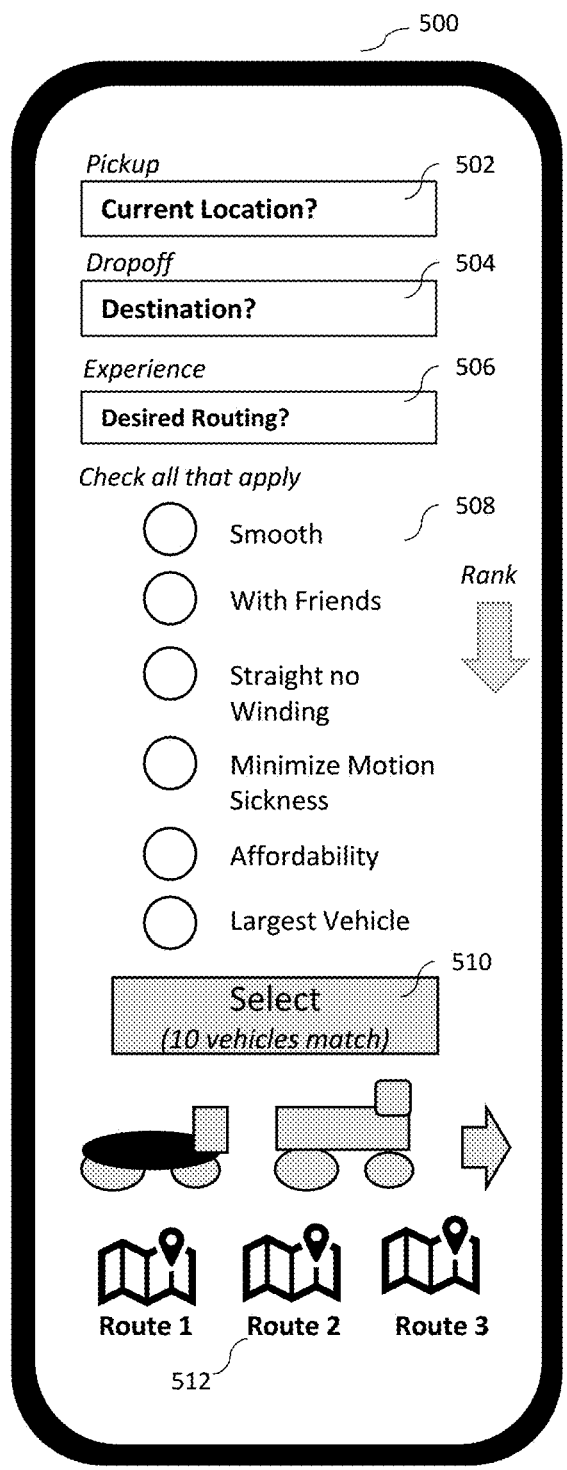
FIG. 5 depicts a mobile application including a plurality of user interfaces configured for execution by one or more processors of a mobile device.

Referring now to FIG. 5, FIG. 5 depicts a mobile application used for scheduling and requesting a pick up and drop off.

In some embodiments, when both the route and the AVs are displayed.

Referring now to FIG. 5, FIG. 5 displays a mobile application. A location of the individual may be obtained from GPS, GLONASS, WiFi, or other location positioning.

Referring now to FIG. 6, FIG. 6 depicts a data. The table may be structured as a key value pair table or other format. The table may be accessible in a data center. The results of a specific search query may be enabled to be optimized across any of the table heading factors.

Still referring to FIG. 6, In some embodiments, the autonomous mode may be limited to a geofenced area, geographic area, or certain environments.

Figure 8:
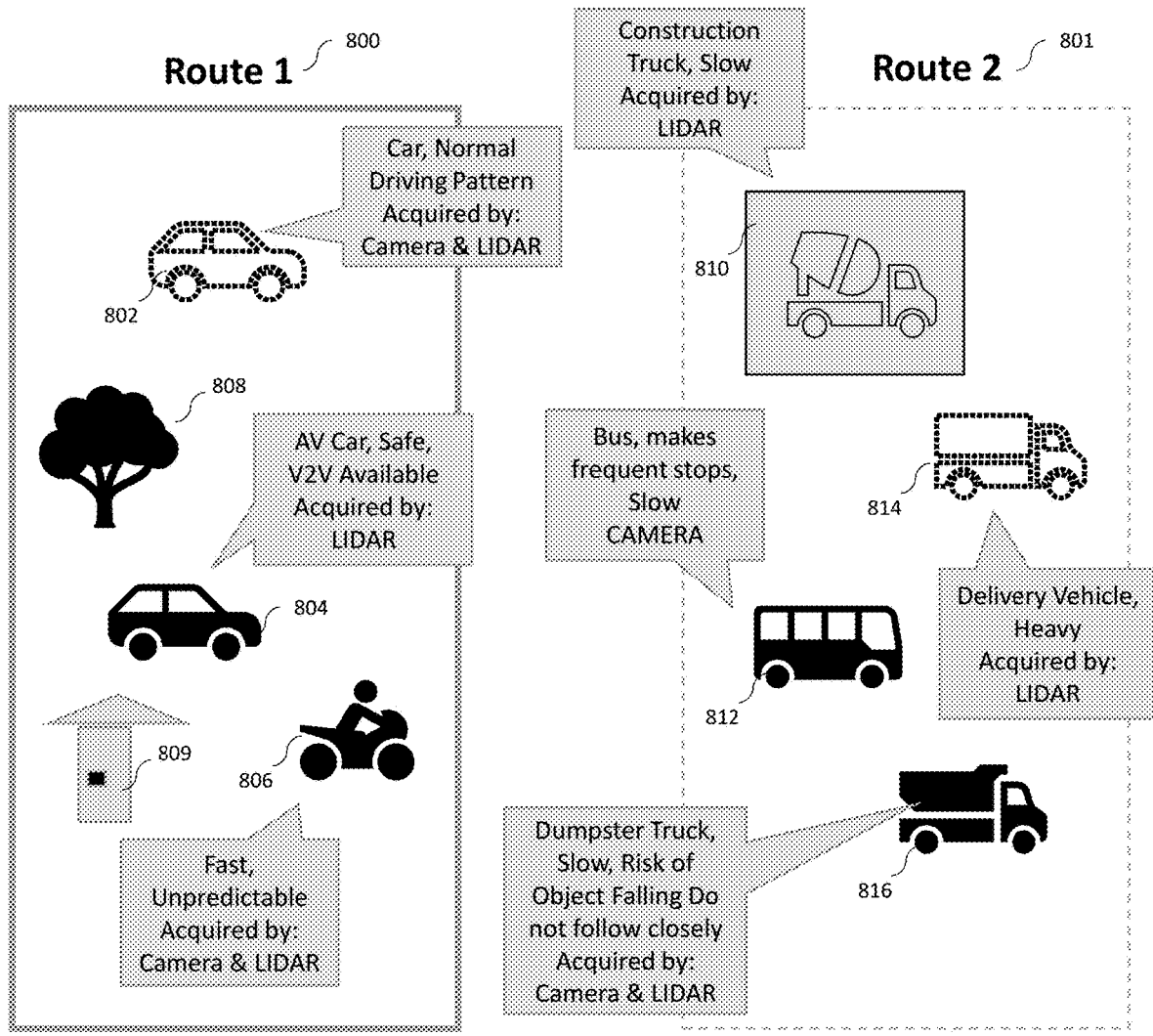
FIG. 8 depicts an artificial intelligence system that captures, identifies, and determines characteristics of objects.

Referring now to FIG. 8, FIG. 8 depicts an object acquisition, identification, recognition, and insight based system to enable better informed information of routes. A cloud based artificial intelligence and machine learning system may be enabled to learn the various paths that on the roadway. With an increasing mix of driver assistance technologies and mixed self-driving cars, there is likely to be a varying level of competence and reliability on the roadways. In a preferred embodiment of the disclosure, the autonomous AV is enabled to respond to other AVs or objects based on the selection of one of a set of paths but also based on a variance rating associated with predicted paths of nearby objects and devices.

For example, particular routes may be associated with a higher variance of delays because they have been historically seen to have certain types of AVs. For example, an AV may capture the AVs on the 101 freeway as including a larger number of semi-trucks, cargo trucks, and large AVs. The AV may send these observations of the environment to a cloud. The acquisitions of the objects may be obtained from a camera, image acquisition device, LiDAR system, or other sensor. The recognition of the objects may occur using one or more processors of the AV or based on a cloud server which receives the acquired objects from the AV via a wireless connection. One or more processors on the cloud may be enabled to use image recognition and machine learning in association with an labeled object data to determine the objects on the route.

These additional routes may be associated with an extra time delay upon the recognition of one or more objects on the roadway.

As an example, if a particular route is prone to delays due to accidents, then it may have a higher variance associated with it and a lower safety score associated with the route. If a particular route, has a number of unprotected left turn signals, it may be associated with a higher complexity score and a lower safety score as an unprotected left turn can be associated with a higher accident rate.

Figure 7:
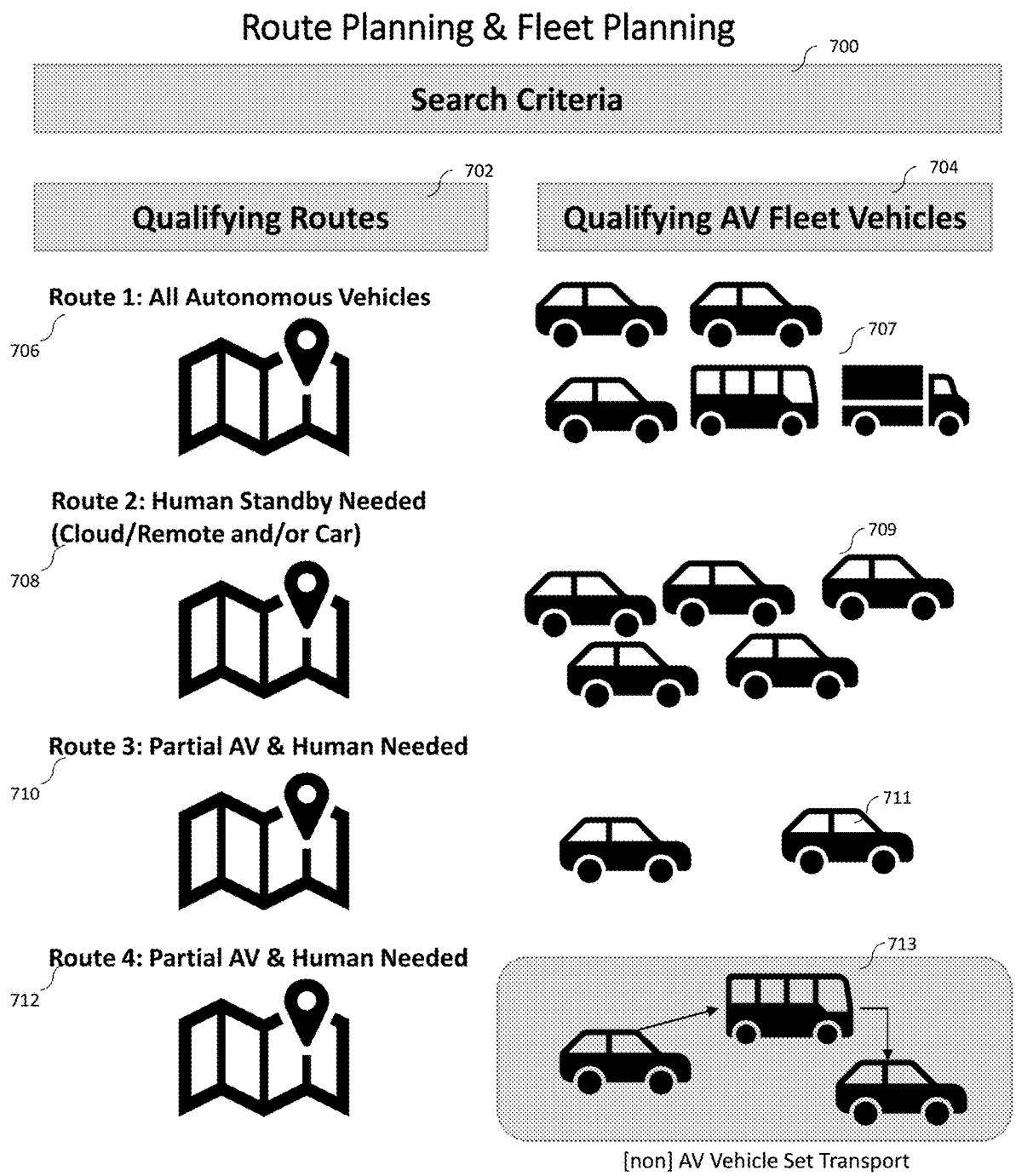
FIG. 7 depicts a search criteria mapping between a request, a plurality of routes, and a plurality of qualifying autonomous AVs in a fleet.

Referring now to FIG. 7, FIG. 7 depicts a search criteria 700, and a resulting results which include qualifying routes 702 and qualifying fleet AVs 704. Each route may be mapped to a set of characteristics of qualifying fleet AVs and actual available fleet AVs that are part of a ridesharing, or AV sharing network. As an example, route 1 706 may be an all autonomous AV route in that the entire start and end point may be satisfied entirely via an autonomous AV. Correspondingly, several types of AVs including dedicated autonomous AVs, autonomous passenger buses, and larger autonomous self-driving trucks may be available on this route. A user may be enabled to select the desired AV or have an AV assigned to them based on one or more parameters.

A second route may require potentially some amount of human assistance. The human assistance may be in the form of the user to be picked up agreeing to sit in a driver position, remaining alert measured via eye tracking, hands on a steering wheel, or another factor. Alternatively, a cloud based remote driving center may function as a remote human assisted driver. In this route 708, a set of qualifying and available AVs may include only cars 709. This choice may be associated with a different time to complete the journey, speed with respect to pickups, cost and other factors.

Route 3 for example, may include at least one portion which can be satisfied by autonomous AV self driving and a portion which must be guided by a human. In this instance, the user may be required to confirm that they will be required to drive the autonomous AV for at least part of the journey. The handoff between autonomous mode and human driven mode may occur while the AV is moving provided that the user is in a driving position, for example, or upon the autonomous AV stopping and allowing the user to assume the driving position. In this situation a select numbers of the ridesharing or car sharing fleet 711 are enabled for such a route and handoff.

Route 4 for example, involves a hybrid approach in which the user may move from a pickup location to a drop off location via a plurality of devices including at least one autonomous AV, a self driving bus, and then another either human driven or self-driven AV. Other devices may be used such as electric scooters or other autonomous and non autonomous AVs.

In some embodiments, the number of routes and number of AVs available will vary significantly based on the regions, density, population, and number of user participating in a ride sharing network.

Referring now to FIG. 8, FIG. 8 depicts various objects that may be found on different routes between a first location and a second location. Each object on a roadway is associated with a category and various characteristics. These objects may be captured using LiDAR, cameras, or other sensor acquisition devices of the autonomous AV. As a plurality of autonomous AVs traverse a particular route, the objects seen on the route may be sent to a server to enable rich 3D, HD, and/or localized maps to be created. These maps map further include a list of and location including coordinates of fixed and moveable objects. For example, the fixed objects may include an identified tree or street sign that is close to the roadway. The moveable objects may include the presence of various cars, trucks, motorcycles, and other objects on the roadway at a certain time of day. These characteristics may be stored in a local database or a network accessible database. These communication to the database may be based on communication from a mobile device or a network device or wireless transmit and receive unit embedded within the autonomous AV. These characteristics may be organized in a hierarchical fashion. A historical database may be consulted such that each route is enabled to be scored with an autonomous AV friendly score that includes an assessment of the number of objects encountered, the number of risky objects encountered, and/or the complexity of environments.

Each map geofenced area, latitude and longitude, intersection, square mile or other unit of reference may include a predicted set of fixed and moveable objects that are likely to be encountered by the autonomous AV. Machine learning may be used to learn from each AV visit to these regions and the capture of the objects in the view of the AV to refine the prediction.

Still referring to FIG. 8, it is an aspect of present disclosure to enable a self-driving car or a driver assistance system which captures various objects, classifies the objects, consults a historical model, calculates a predictive model, assess a prediction associated with the object to follow a certain path or direction, and to modify the current AV's trajectory or movement based the calculation.

As an example, on Route 1 various objects may be identified via the autonomous AVs camera and via LiDAR and/or another sensor device or combinations thereof. For example, an outline of an object 802 may be captured via LIDAR. The outline of the object may be consulted against and object identification system to understand perception of the environment. One or more neural networks may be leveraged to learn the outline of objects and the likely object that it represents. The car may be identified by its contours, by an image recognition program, by its movement patterns, by its constituent elements such as its wheels, or by one or more other factors. Another AV 804 may be imaged and/or captured via LIDAR by the AV, and further identified as a AV. The AV 804 may be determined to support AV to AV communication via millimeter wavelength, cellular, Bluetooth, Bluetooth LE, WiFi, or another wireless communication mechanism. A third moveable object 806 may be identified as a motorcycle which is fast unpredictable. The shape of the motorcycle may be part of the AI, image recognition and/or machine learning system of the autonomous AV.

A fixed position object such as a tree 808 may further be identified on the roadway and be linked to a location. Another fixed position object may include a door 809. Various doors maybe imaged and captured so as to identify the appropriate place to drop a passenger off or to leave or pick up a package. Houses themselves may be imaged and a camera may be linked to a mobile application so as to identify the house that is appropriate for a drop off and or pick up. This could address the lack of fidelity of GPS within close distances. A Wi-Fi SSID may also be used to identify the appropriate drop off place. That is a user may associated an SSID with a location and GPS and/or pickup/drop off location. The mobile application of a ride sharing application or an AV may further identify the GPS, Wi-Fi, and/or image of a house, door, or person/passenger. That is the maps accessible by the server and autonomous AV may crowd-sourced or AV sourced 3D, high resolution, pictures, locations, and contours of various objects. These objects may in turn be identified by one or more processors within the autonomous AV and/or on a cloud based server. The tree for example, may be used further as a waypoint marker beyond GPS, Wi-Fi location, or another factor to appropriately identify the progress of the autonomous AV. The autonomous AVs may be equipped with various cellular transmit and receive capabilities including 3G, 4G, 5G, LTE, LTE Advanced, 802.11x any variant, satellite, laser, and other communication technologies.

Still referring to FIG. 8, an example route 2 may include various other moveable and fixed objects that have been captured by prior A Vs travelling on the route. Objects captured by other autonomous AVs may include a construction AV 810. The outline of the AV may further be obtained by one or more LIDAR systems. The AV may use a plurality of light detection and radar components to image simultaneously and/or sequentially a plurality of objects. A user may be incentivized to tag various objects captured by the AV to appropriately train the artificial intelligence platform. The tagging of various objects may be done in a remote site via access to the cloud server. As an example, images captured by the autonomous AV may be sent to the cloud and stored for analysis, processing, and machine learning.

Various other environmental parameters may also be captured by one or more autonomous AVs and updated to the maps system. For example, the condition of the roads may be assessed by the autonomous AV. This may include the presence of lane markers, the temperature of the road and environment, the amount of sunlight and shade on various parts of the road, the presence of oil, leaves, debris, ice, snow, water, and/or puddles on the road. This information may be sent to the cloud mapping system to identify areas for the autonomous AV to avoid. For example, the autonomous AV may be enabled to avoid the lane to the far left as it is tends to collect significant amounts of water during rain periods. Alternatively, various areas that remain cold, collect debris or are in the shade may be avoided for the risk of the AV skidding. Alternatively, these areas could be marked as points of interest for a cleaning AV, self driving truck, self driving street sweeper, a de-icing AV, a salting AV, street paver, or other device to focus on to maintain a proper road.

Still referring to FIG. 8, FIG. 8 further shows a plurality of other devices such as trucks 814, busses 812, and construction AVs 816. Each of these objects may be associated with a positive, negative, or neutral rating associated with being autonomous friendly. As an example, a dumpster truck 816 may be associated with a negative autonomous friendly rating as it has been tagged with being slow and having a risk of falling objects. Further, the object may be associated with falling objects. Route 2 may therefore be associated with a less autonomous friendly path than route 1. In routing a new path of the autonomous AV the historically captured items may then be learned such that a new request to travel will be routed on the more autonomous friendly path.

Figure 9:
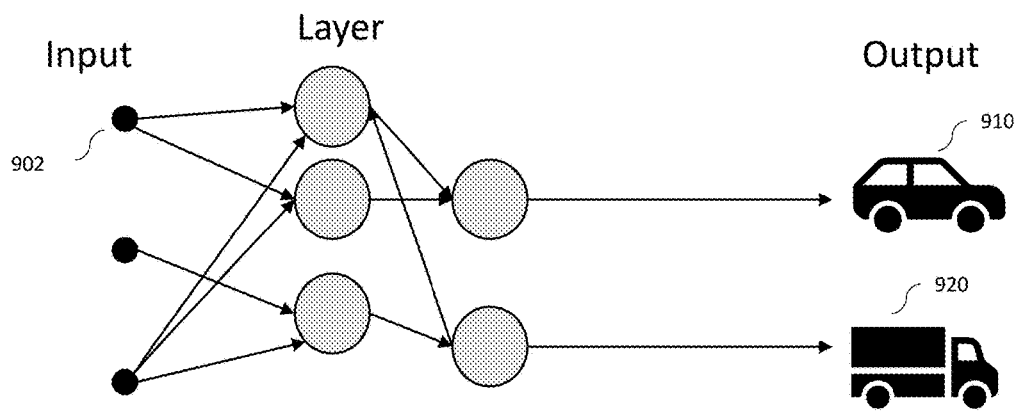
FIG. 9 depicts a neural network that is used to make identifications of various objects.

Referring now to FIG. 9, FIG. 9 depicts a neural network 900 that can be learned to identify various objects acquired 902 by image sensors, LiDAR, 3D contours, wireframes or one or more items. An input 902 may be learned to identify the various items such as a AV 910 or a truck 920. These items may further be linked to AV friendly scores. Objects made be added to the models over time. The AV friendly index as stored by a server may be adjusted over time. These AV friendly scores can then be linked to future predictions as to which route is most autonomous AV friendly. The autonomous AV cloud infrastructure 1002 may include a plurality of servers and mapping systems that are enabled to capture historical data from a plurality of autonomous AVs, perform recognition on the objects, score various routes, and preference stack one route over another route. The routes may further be influenced by the AV characteristics. Convolution neural networks (CNNs) may further be leveraged for learning image based aspects. Other items may be learned including front-doors for package delivery, porches, restaurant, building entrances, driveways, and houses to enable for easier pick up, drop off, and passenger and package deliveries.

Figure 10:
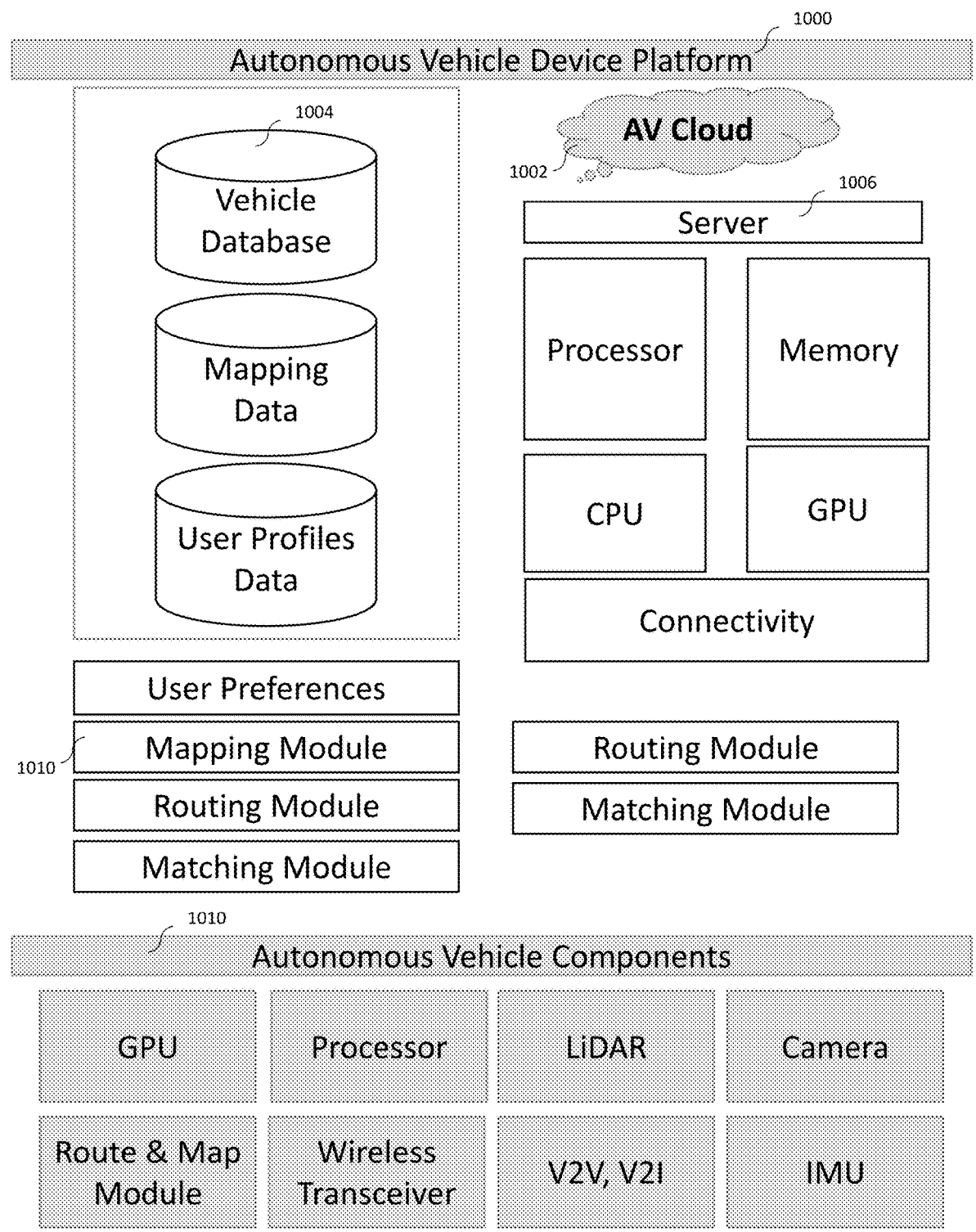
FIG. 10 depicts a plurality of components of the autonomous AV platform and an autonomous AV.

Referring now to FIG. 10, FIG. 10 depicts various components of an augmented reality platform including one or more servers 1006, databases, and software modules. Various hardware components may store and assist with the processing of instructions including memory, non-volatile memory systems, databases. Various programmable systems, software code, and instructions may be configured for execution by a processor on a mobile device, laptop, cloud, server, autonomous AV component, or other device.

Various software instructions and/or modules may be implemented and stored in a non transitory computer readable medium. This software may be executed by hardware components including one or more processors. These processors may include CPUs, GPUS, specialized Artificial Intelligence processors leveraging custom ASICs. The servers may be enabled with connectivity systems including wired and wireless transmit and receive units.

Still referring to FIG. 10, FIG. 10 depicts various data storage components including an autonomous AV preferences, a mapping data storage, and a set of user profile data. The data may be stored in various databases, nosql data storage areas, and data warehouse.

Still referring to FIG. 10, FIG. 10 depicts specific modules of the platform including a user preferences module, a mapping module, a routing module, 1004 and a matching module. The user preferences module include an interface to user data. FIG. 10 further depicts various functional blocks of the autonomous AV 1010 including a graphics processing unit (GPU), CPU, LiDAR, Cameras, route and mapping modules, wireless transceivers including millimeter wave length, cellular and Bluetooth connectivity, IMU, and other sensors.

It is an aspect of the present disclosure for the remote processing to be performed in a serverless system.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching.

What is claimed is:

1. A system for determining a navigational approach of an autonomous vehicle comprising:
   a server comprising a processor configured to determine a plurality of navigational surface approaches between a first location and a second location;
   the processor configured to generate a preferred ranking of the plurality of navigational surface approaches based on one or more capabilities of the autonomous vehicle, a historical variance associated with the time to complete each of the navigational surface approaches, a motion sickness minimization based at least in part on a user profile and captured historical data on motion sickness, and a pre-calculation of an environment, wherein the pre-calculation includes a score of an intersection based at least in part on of historical traffic incidents, and a prediction of potential objects to be encountered; and
   wherein the server is configured to send instructions to the autonomous vehicle to proceed on a selected one of the plurality of navigational surface approaches to a specific pickup or drop off location based on an identification of a recognized object and global positioning system data.

2. The system of claim 1, wherein a separate computing device to the autonomous vehicle is configured to calculate a navigational route and communicate the results of the computation to the autonomous vehicle over at least one wireless network.

3. The system of claim 1, wherein the server determines the selected one of the plurality of navigational surface approaches based on a user preference.

4. The system of claim 3, wherein the server provides one or more configurations to the autonomous vehicle.

5. The system of claim 1, comprising a non-transitory computer readable medium for a mobile application; wherein the mobile application is enabled to provide configurable characteristics of the autonomous vehicle and a navigational route utilized by the autonomous vehicle.

6. The system of claim 1, wherein the server determines a set of available autonomous vehicles; and wherein the server selects the autonomous AV out of the set of available autonomous vehicles based on the preferred ranking of the plurality of navigational surface approaches matching the capabilities of the set of available autonomous vehicles.

7. The system of claim 1, wherein a machine learning system, accessible by the server, utilizes a plurality of data including a plurality of objects and a plurality of incidents along the navigational surface approach to refine the preferred ranking of navigational surface approaches.

8. The system of claim 1, wherein a machine learning system accessible by the server matches the selected one of the plurality of navigational surface approaches based on a complexity score of one or more of the plurality of navigational surface approaches based on prior evidence of an object recognition system that identifies vehicle movements.

9. The system of claim 1, wherein the server calculates an AV friendly score based on one or more constraints of time, a classification of objects of an environments, and a scoring of the classification of objects.

10. A method executed at least in part by an autonomous vehicle and a server comprising:

determining by a processor of the server a plurality of navigational surface approaches between a first location and a second location;

generating by the processor a preferred ranking of the plurality of navigational surface approaches based on one or more capabilities of the autonomous vehicle, a historical variance associated with the time to complete each of the navigational surface approaches, a motion sickness minimization based at least in part on a user profile and captured historical data on motion sickness, and a pre-calculation of an environment, wherein the pre-calculation includes a score of an intersection based at least in part on historical traffic incidents, and a prediction of potential objects to be encountered; and communicating by the server instructions to the autonomous vehicle to proceed on a selected one of the plurality of navigational surface approaches to a specific pickup or drop off location based on an identification of a recognized object and global positioning system data.

* * * * *